United States Patent

[11] 3,548,896

| [72] | Inventors | Richard C. Larsen<br>2171 S.E. 130th Ave., Portland, Oreg. 97233;<br>Jim May, 12110 S.E. Pine St., Portland, Oreg. 97214 |
|---|---|---|
| [21] | Appl. No. | 662,216 |
| [22] | Filed | Mar. 30, 1967 |
| [45] | Patented | Dec. 22, 1970<br>Continuation of application Ser. No. 304,753, Aug. 27, 1963, now abandoned. |

[54] DIMENSIONAL CUTTING SAW APPARATUS
9 Claims, 7 Drawing Figs.

[52] U.S. Cl. ........................................... 143/47, 143/38
[51] Int. Cl. ........................................... B27b 5/18, B27b 5/00
[50] Field of Search .................................. 143/38, 47, 47.1—47.4, 160—160.4

[56] References Cited
UNITED STATES PATENTS

| 742,848 | 11/1903 | Dyer | 143/38 |
| 683,590 | 10/1901 | Brower | 143/47 |
| 1,725,295 | 8/1929 | Orr | 143/47X |
| 2,609,848 | 9/1952 | Schneider | 143/38 |
| 2,800,932 | 7/1957 | Scott | 143/38 |
| 3,062,249 | 11/1962 | Gray | 143/38X |
| 3,374,813 | 3/1968 | Tillery | 143/38 |
| 3,398,771 | 8/1968 | May | 143/38 |

Primary Examiner—Harrison L. Hinson
Attorney—Eugene M. Eckelman

ABSTRACT: A portable saw apparatus comprising a main frame having rails on its upper side. A carriage is supported on the rails for longitudinal forward and reverse movement on the main frame and has a frame or platform portion projecting beyond one side of the main frame. The carriage supports a horizontal saw and a vertical saw both having cutting edges in adjacent relationship to cut strips from a log disposed in a stationary position. A stop arm is provided on the main frame for engagement with a vertical cut portion of the log to set the main frame for a selected cut thickness. An ejector is supported on the carriage for returning cut strips with the carriage.

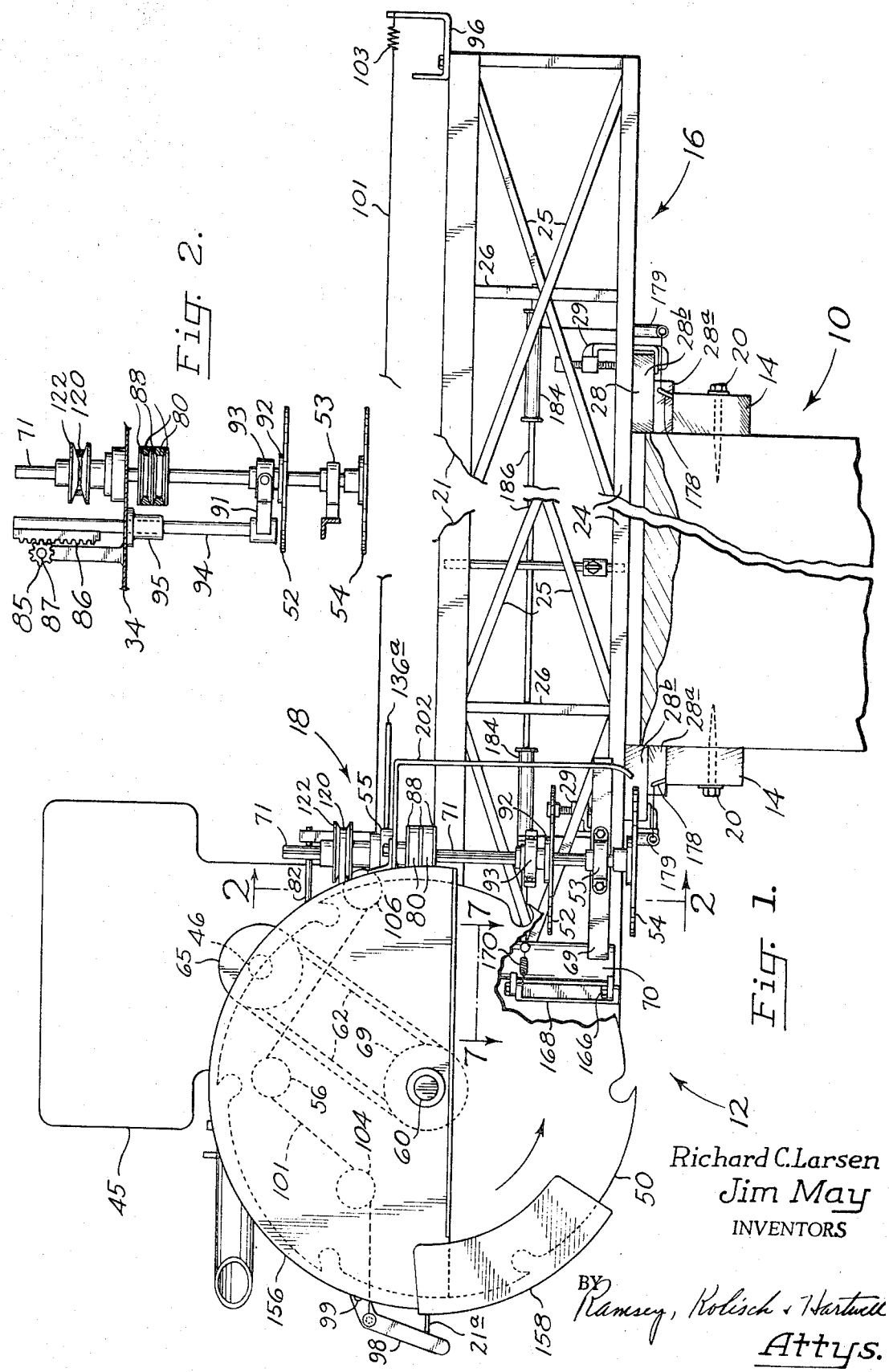

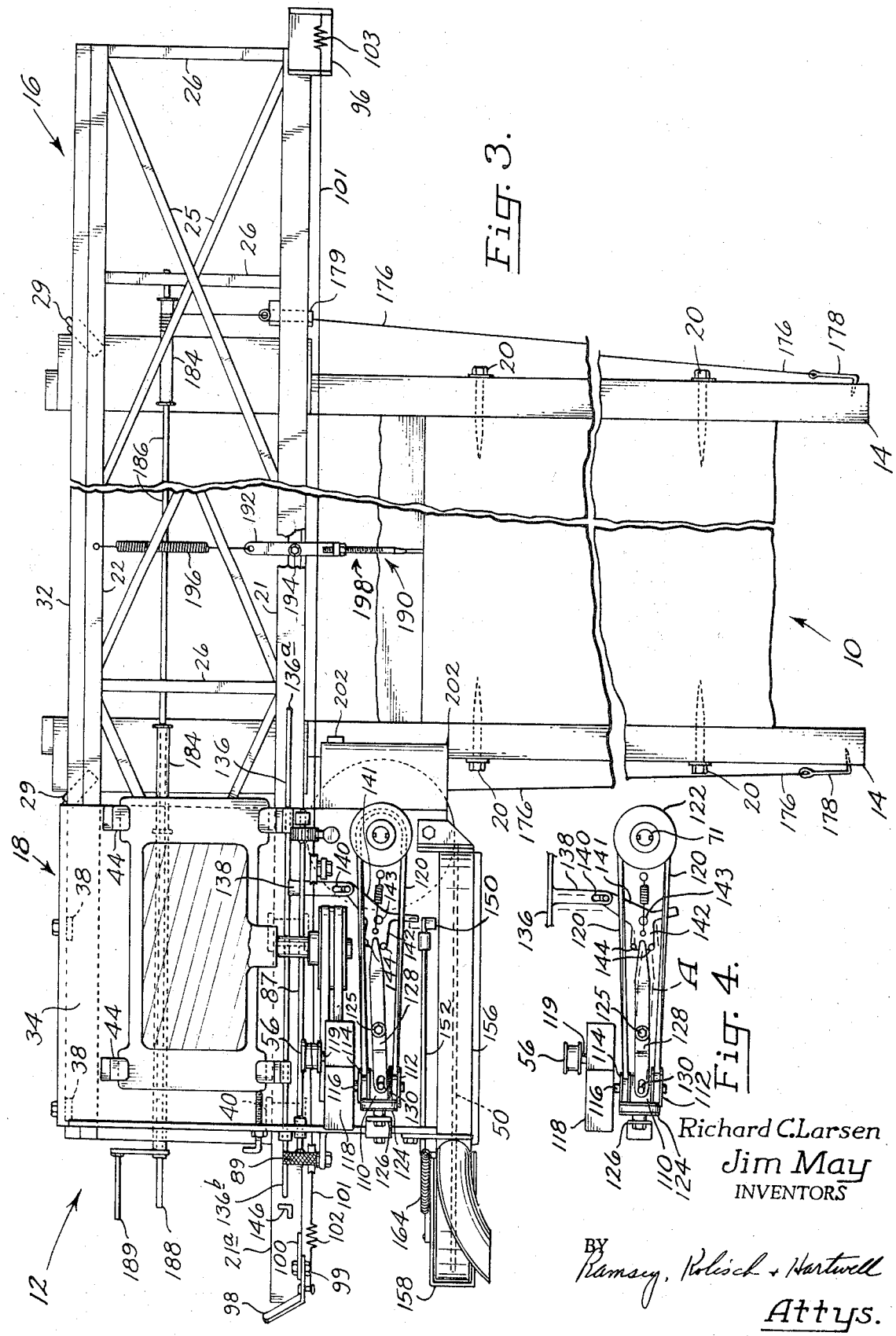

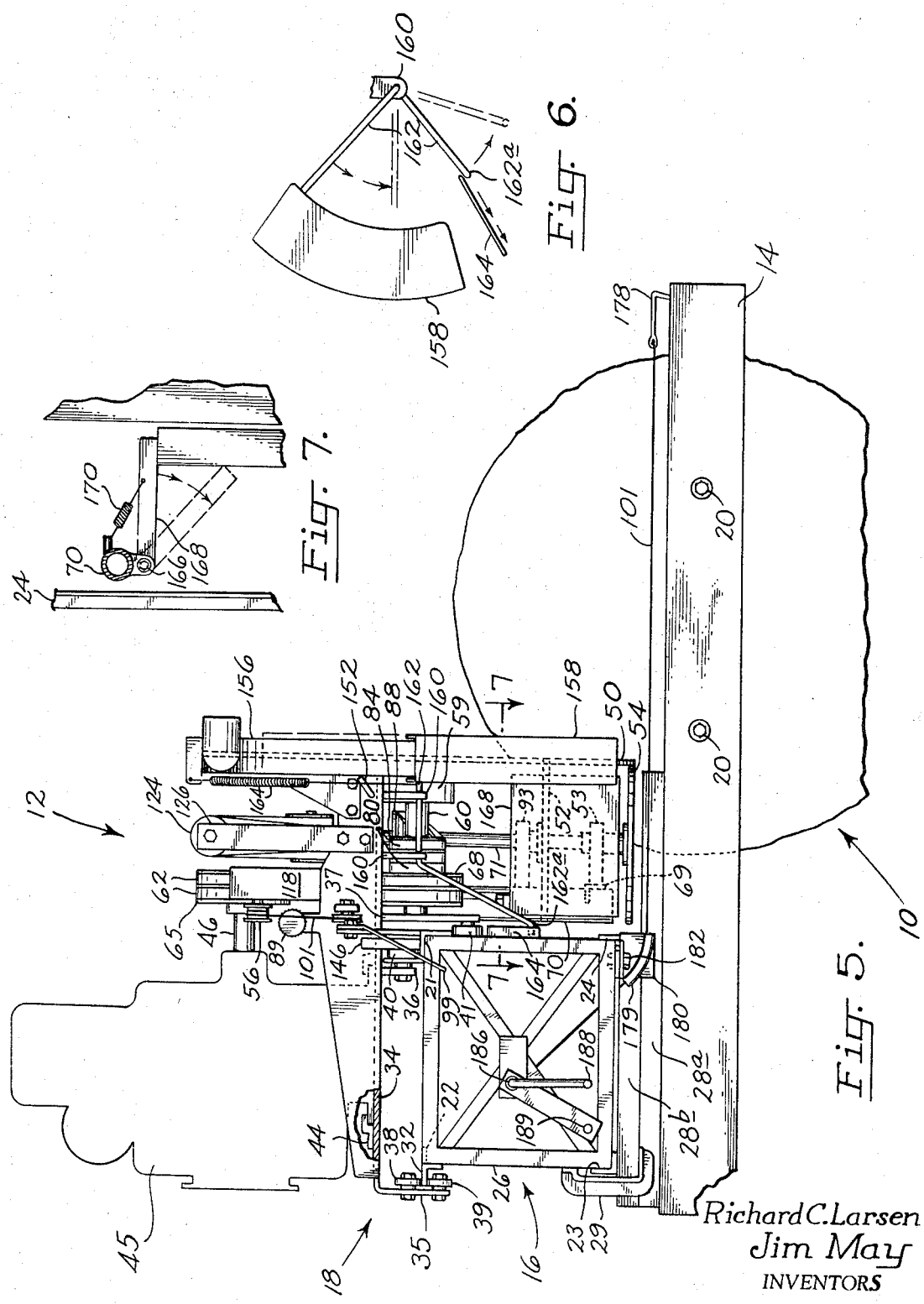

DIMENSIONAL CUTTING SAW APPARATUS

This application is a continuation of application Ser. No. 304,753, filed Aug. 27, 1963 for Dimensional Cutting Saw Apparatus, now abandoned.

This invention relates generally to saw apparatus, and more particularly to saw apparatus employable to cut boards of predetermined dimension from a log, the apparatus, therefore, being referred to herein as dimensional cutting saw apparatus.

The apparatus of the invention features a construction whereby it is portable from one site to another. Thus, the apparatus is particularly useful in cutting lumber from logs at the site where they have been felled.

One method of harvesting trees and producing lumber comprises felling the trees, and then transporting the felled trees as logs to a mill where the logs are cut into lumber. While such a practice is feasible in some instances, this is not always the case. For instance, forest regulations sometimes prevent the conversion of logs into lumber in this fashion, by barring from a forest the usual logging equipment. Even in those instances where the log-handling equipment and log carriers are permitted in the forest, it is required that access roads be built, at a cost which renders harvesting of the trees uneconomic. There is the additional factor that in certain areas, tracts of timber may be of such small size, or be scattered over such isolated areas, or located in such difficult terrain, as to make removal of logs for transport to a mill a complicated and costly problem. These and other considerations have indicated the desirability of portable means for cutting lumber which may be transported directly to the site of a log where it falls on the ground. By cutting lumber from such a log and then moving the cut lumber, frequently transportation costs may be lowered, the need for extensive access roads is eliminated, and areas can be cleared of usable wood which by regulation cannot be handled using ordinary lumbering techniques.

Generally, an object of the invention is to provide improved portable saw apparatus, for producing dimensionally cut boards from a fallen log at the site where it has been felled.

Another general object is to provide apparatus of this description which may be moved from one place to another, set up, and operated, with a minimum number of men. The apparatus requires little supervision, and in many instances can be easily operated by one person.

It is not uncommon for a log, particularly if it has been cut from older timber, or if it has lain on the ground for some time, to be imperfect over certain regions therein. In cutting boards from such a log, it is desirable to cut the log in such a manner that imperfect portions may be separated out, with a minimum amount of good wood with these imperfect portions, and to leave the remainder of the log in such a state that sound boards of maximum length may be cut therefrom. The apparatus of this invention features a novel organization of saws, and means for making certain adjustments therein, whereby these ends and thus optimum utilization of good wood may be realized.

In cutting lumber from a log, obtaining proper dimensions in the boards produced is important. Portable saw-cutting apparatus proposed heretofore has been subject to a number of disadvantages, including in many instances the inability to make accurate cuts. A principle reason for this deficiency has been the presence of sawdust, which has introduced variances in the paths that the saw or saws in the apparatus take during a cutting pass. The apparatus of this invention is characterized by the presence of a novel framework for supporting the saws, which defines the paths over which the saws of the apparatus move, with such paths being unaffected by the production of sawdust during the cutting operation.

More specifically, an object of this invention is to provide portable saw apparatus including a novel frame or truss which may be supported on tracks anchored adjacent the ends of a log, such truss providing support for a movable carriage upon which are mounted the saws in the apparatus. The truss comprises a rigid element that guides the carriage along a straight path, with said path disposed to one side of the log being cut.

A further object is to provide novel means for supporting such a frame or truss, whereby the frame may be shifted in steps transversely of a log, as boards are cut from the log.

Yet another object is to provide novel means for controlling the stepwise advancement of the supporting truss or frame, as successive cuts are made.

A still further object is to provide novel means whereby boards are automatically ejected from a log after they have been cut, by return movement of the carriage to the position it has immediately prior to starting a cutting pass.

Still another object is to provide saw apparatus including a movable carriage, with power-operated means for shifting the carriage back and forth on a supporting frame, the carriage-mounting saws that produce a cut with the carriage moved in one direction, and further mounting ejection mechanism that displaces a cut board with the carriage moved in the opposite direction.

Another object is to provide in such saw apparatus automatic means for controlling movement of the carriage back and forth on its supporting frame.

These and other objects and advantages are attained by the invention, and the same is described hereinbelow in conjunction with the accompanying drawings, wherein:

FIG. 1 is a side elevation of apparatus constructed according to an embodiment of this invention, with parts broken away, the apparatus being shortened substantially by the removal of intermediate portions thereof;

FIG. 2 is a view of mechanism provided for adjusting the position of one of the saws in the apparatus, taken generally along the line 2–2 in FIG. 1;

FIG. 3 is a top plan view of the apparatus with portions removed;

FIG. 4 is a view illustrating reversing mechanism for a carriage in the apparatus, that produces change in the direction of travel of the carriage;

FIG. 5 is an end view of the apparatus, showing the same mounted on a log, and at the start of a cutting pass;

FIG. 6 illustrates means in the apparatus controlling movements of a saw guard; and FIG. 7 illustrates the operation of lumber ejector mechanism provided in the apparatus.

Referring now to the drawings, and first of all more particularly to FIGS. 1, 3, and 5, here there is shown portable, dimensional cutting, saw apparatus generally at 12, mounted in operative position on a log 10. In FIGS. 1 and 3, the log is shown considerably shortened from the type of log which usually would be used to make lumber in order to condense the drawings. The log is resting on the ground, in a horizontal position, and is typical of the type of log that may be produced by felling a tree, and cutting its trunk into sections of predetermined length.

Apparatus 12 comprises, in general terms, a pair of track elements 14 adjacent the ends of log 10, an elongated frame or truss 16 extending longitudinally of the log, with its ends supported by track elements 14, and a carriage 18 mounted on frame 16 and movable to and fro along the length thereof.

Track elements 14 may comprise rails of wood or other material, anchored in a horizontal position as by fastening the elements to the ends of the log, using fasteners 20. During use of the apparatus, frame 16 (which is supported by the track elements) is advanced in steps along a horizontal path extending transversely of the log defined by these elements.

In the form of the invention illustrated, frame or truss 16 comprises elongated skeletal structure, suitably braced, whereby between its ends it provides substantially rigid support for carriage 18 which is movable along the length of the frame. Thus, the frame includes the elongated bars 21, 22, 23, and 24 extending along each of the corners of the structure, and defining a substantially square cross-sectional outline for the frame (see FIG. 5). As best illustrated in FIGS. 1 and 3, the bars are interconnected and braced by inclined brace members 25. Transverse frame sections 26 are provided at intervals along the length of the truss, adjacent the ends of brace members 25.

Frame 16 is supported on track elements or rails 14 through guide elements or shoes 28 fastened by means such as clamps 29 to the underside of the frame. Each shoe or guide elements, as in the embodiment shown (see FIGS. 1 and 5), may comprise a pair of boards 28a, 28b suitably joined together. It will be noted that the lower board 28a projects outwardly to the right of frame 16 in FIG. 5. Carriage 18, and associated parts supported by the carriage, includes substantial structure to the right of the frame in FIG. 5, and this projection of the lower board is important in inhibiting any tendency in the frame and carriage to tip over, by swinging to the right and down in FIG. 5.

Secured to frame 16, adjacent the top and along one side thereof, is a rail 32 extending along the length of the frame. This rail, and bar 21 extending along the opposite side of the frame, support carriage 18, while accommodating movement of the carriage longitudinally of the frame.

More specifically, carriage 18 comprises a platform 34, which has depending portions 35, 36, 37 (see FIG. 5) projecting down from the bottom thereof. Rollers, such as rollers 38, 39, ride on the top and bottom, respectively, of rail 32, and are journaled on depending portion 35. Riding on the top of bar 21, and journaled on depending portion 36, are flanged rollers, such as roller 40. Journaled on depending portion 37, and riding against the under edge of bar 21, are rollers such as roller 41.

Platform 34 of the carriage supports a motor 45 attached to the platform as by cleats 44. Motor 45 may take the form of a conventional internal combustion engine. An output shaft for the motor is indicated at 46. In the embodiment of the invention illustrated, motor 45, through its output shaft, provides power for rotating each of three circular saws, indicated at 50, 52, 54, and for rotating a pulley, indicated at 56, whereby movement of the carriage under power, in either of opposite directions on the frame, may be produced.

More specifically, journaled on the carriage, on the underside of platform 34, in a mounting such as mounting 59 (see FIG. 5) is a substantially horizontal arbor or shaft 60. Saw 50, already described, which occupies a substantially vertical plane, is secured to one end of shaft 60. Power is transmitted from output shaft 46 of motor 45 to shaft 60, through a pair of drive belts 62. These are trained about a pair of pulleys 65 secured to the output shaft of the motor, and another pair of pulleys 68 secured to shaft 60.

Saws 52, 54 are equisized, and somewhat smaller than saw 50. The saws occupy substantially horizontal planes, i.e., planes that intersect at right angles the vertical plane of saw 50. As will best be noted by referring to FIG. 5, the plane of the bottom saw 54 passes through the bottom edge of saw 50, i.e., saw 54 lies in a plane extending tangentially of saw 50. Furthermore, the right edges of saws 52, 54 lie in the plane of upright saw 50, i.e. saw 50 lies in a plane extending tangentially of saws 52, 54. With the carriage moved longitudinally along frame or truss 16, the horizontal saws together with vertical saw 50 are operable to cut elongated strips from a log, having predetermined dimensions, as will be hereinafter described.

Saws 52, 54 are mounted on a vertical shaft or arbor 71, journaled in bearings 53, 55. Bearing 53 is mounted on a bar 69, and the latter in turn is secured to a post 70 joined to and projecting down from platform 34 of the carriage. Bearing 55, on the other hand, is mounted directly on platform 34. It should be noted that arbor 71 is located substantially forwardly of arbor 60.

Power is transmitted from motor 45 to arbor 71, through a pair of belts 80 trained at one end about pulley pairs 84 fastened to shaft 60, and pulley pairs 88 fastened to arbor or shaft 71. Pulley pairs 88 and 84 have axes disposed at right angles to each other, and thus belts 80 have a 90° twist between the pulley pairs.

When cutting lumber from a log, bottom saw 54 produces a cut or kerf defining the bottom edge of a board, and vertical saw 50 produces a cut or kerf defining one of the sides of this board. Saw 52 divides the strip of wood cut by saw 54 and saw 50, with the plane of division along this strip being located at where the plane of saw 52 is located. In order to make possible the maximum production of sound lumber from a log, with the elimination of decayed or imperfect areas from such lumber, provision is made for saw 52 to be vertically adjustable on arbor 71, so that this plane of division may be changed as the condition of a log warrants.

Specifically, and referring to FIGS. 1 and 2, saw 52 is secured to a hub 92, which is keyed to arbor 71 so as to rotate with the arbor, while at the same time be shiftable axially on the arbor. Hub 92 is journaled in a bearing 93, and bearing 93, in turn, is supported in a yoke 91. To produce vertical movement in yoke 91, and with yoke 91, saw 52, a rod 94 is provided, which is slidably mounted in a sleeve 95 secured to platform 34, and which is joined at its bottom end to the yoke. A worm gear 85 engaging gear teeth 86 joined to the top of rod 94 is turned to produce up and down movement of the rod and the yoke at the bottom end thereof.

Worm gear 85 is mounted on a shaft 87, which, as can be seen with reference to FIG. 3, is secured to a knob 89 at one end of the apparatus. With the construction described, by rotating knob 89, appropriate vertical positioning of saw 52 may be accomplished.

While saw 52 is vertically adjustable, saw 54 remains stationary. Thus, this saw may be mounted on arbor or shaft 71, by securing it directly to the bottom of the arbor.

It is important that arbor 71 be located substantially forwardly of horizontal arbor 60 supporting the vertical saw. By so spacing the arbors, clearance is assured between the peripheral edges of the various saws. In the case of vertically adjustable saw 52, the spacing between the arbors is sufficient to provide clearance between this saw and the horizontal saw, in all positions of saw 52.

According to this invention, carriage 18 is moved under power in one direction along frame 16, from the starting position shown in FIGS. 1, 3, and 5, to produce a cutting pass for the saws, with the saws then cutting into the log and operating to cut lumber. The carriage is returned, under power, to its starting position, prior to the saws undergoing another cutting pass. The returning movement of the carriage is utilized to displace just-cut boards from where they reside in the log, by ejecting them axially from the log. The carriage, and the means in which it is moved to and fro, will be now described.

Referring to FIGS. 1 and 3, mounted on frame 16 at the far end of the frame from where the carriage is at its starting position, is a bracket 96 with opposed, upstanding legs. Mounted on the other end of the frame, on an extension 21a of bar 21, is an arm 98 which is pivoted at 99 on a bracket 100 secured to extension 21a. A cable 101 is connected, through springs 102, 103, to bracket 96 and arm 99, respectively. Cable 100 is held under tension, with the lower end of pivoted arm 98 against extension 21a, as shown in FIG. 1. Between springs 102, 103, cable 101 extends over suitable pulleys 104, 106 journaled on the carriage, and is wrapped around power-driven pulley 56, already described.

Mounted on carriage 18 above its platform 34 (and referring to FIGS. 3 and 4) is a reversing transmission 110 with pulleys 112, 114 on either side thereof. An output shaft 116 of the reversing transmission extends into a gear box 118 mounted on the carriage alongside the reversing transmission. Pulley 56 having cable 101 wrapped about it, is connected to output shaft 119 of gear box 118.

As already described, arbor 60 with saw 50 attached is driven by motor 45 through belt 62, and belts 80 drivingly connect arbor 60 and arbor 71. Drivingly interconnecting arbor 71 and reversing transmission 110 is a belt 120 which at one end is trained about a pulley 122 keyed to arbor 71, and at its other end is trained about a pulley 124 journaled on an upstanding bracket 126 fastened to the carriage. Between pulleys 122, 124, the reaches of belt 120 extend over pulleys 112, 114 of the reversing transmission. With the structure described, upon rotation of belt 120, pulley 112 rotates in one direction, whereas pulley 114 rotates in the opposite direction.

Referring now to FIGS. 3 and 4, pivotally supported at 125 on platform 34 of the carriage is an arm 128. Arm 128 has one end connected, through pin and slot connection 130, to means in the reversing transmission which is effective to connect shaft 116 to either pulley 114 or pulley 112. With arm 128 in the position shown in solid outline in FIG. 3, pulley 114 is connected to shaft 116, and the shaft is rotated in a direction causing pulley 56 to advance the carriage along the frame. With the arm in the dashed position shown at 128A in FIG. 4, pulley 112 is connected to shaft 116, and the shaft (and pulley 56) are rotated in the opposite direction, so that pulley is effective to cause the carriage to move in the opposite direction on frame 16. In solid outline in FIG. 4 a neutral position for the arm is shown, where neither one of the pulleys is connected to shaft 116.

The dimensional cutting saw apparatus is constructed so that after the completion of a cutting pass, the carriage will return automatically to its starting position, and then cease its movement, to enable necessary adjustments to be made before another cutting pass is undertaken. Such automatic control of the carriage movement results from the inclusion of an elongated feeler rod 136 (refer again to FIG. 3), which is slidably mounted on platform 34 of the carriage, and connected to arm 128 in such a manner as to produce necessary movement in the arm.

Considering in more detail the functioning of feeler rod 136, connected to the rod intermediate its ends is an ear 138. Ear 138 is connected, by pin and slot connection 140, to an arm 141 of a member 142 pivoted at 143 on the top of platform 34. Member 142 includes pins 144 straddling arm 128, and is operable to shift arm 128 to the different positions already described for the arm on swinging of the member about pivot means 143.

In FIG. 3, feeler rod 136 has been shifted forwardly (or to the right in the figure). With rod 136 so positioned, member 142 holds arm 128 in a position producing movement of the carriage forwardly on frame 16 in a cutting pass for the saws. Reverse movement of the carriage is produced by feeler rod 136 shifting to the left relative to the carriage in FIG. 1, which is done automatically at the end of a cutting pass for the saws by end 136a of the feeler rod striking a leg of bracket 96 at the far end of the frame. On the carriage returning to its starting position, end 136b of the rod strikes a bracket 146 joined to extension 21a of the frame, which results in rod 136 shifting forwardly relative on the carriage. In FIG. 3 a stop 150 is shown, which may be flipped to the position shown in dashed outline for the stop, by turning rod 152. With the stop in the position shown in dashed outline, member 142 is prevented from moving beyond its neutral position by the action of rod 136 striking bracket 146.

Over the top of vertical saw 50, a fixed saw shield 156 is shown, which is mounted in a fixed position on the carriage. A movable saw shield or guard 158 covers edge portions of saw 50 downwardly from shield 156. As best seen in FIGS. 5 and 6, movable saw shield 158 is pivotally supported on the underside of platform 34, by brackets 160, which rotatably support a rod 162 joined to the shield 158. A spring 164 (see FIG. 3) connected between saw shield 158 and an upper part of shield 156 is effective to pull the shield 158 up and out of the way, when carriage 18 moves forwardly on the frame during a cutting pass for the saws (into the position indicated in dashed outline in FIG. 5). The movable saw shield is moved downwardly, to a position covering lower edge portions of saw 50 (as shown in solid outline in FIG. 5), by end 162a of rod 162, which moves under a cam 164 joined to frame 16, when carriage 18 nears its starting position upon return movement of the carriage.

Referring now to FIGS. 1 and 7, pivotally supported by pivot means 166 on post 70 depending from carriage platform 34 is an ejector plate 168. A spring 170 interposed between the ejector plate and post 70 is operable to urge the plate to the position shown in FIG. 1 and in solid outline in FIG. 7, where the plate is perpendicular to the path of movement for the carriage along the frame. As shown in FIG. 7, the plate may swing from this position to a position more closely paralleling the frame, indicated in dashed outline in the figure.

When carriage 18 moves down the frame during a cutting pass for the saws, ejector plate 168 swings to the dashed position indicated in FIG. 7, thus to accommodate the passage of the boards cut from the log by the saws travelling past the ejector plate. Upon the completion of a cutting pass, and plate 168 clearing the ends of just-cut boards, the plate swings to its perpendicular position. Upon the carriage then returning to its starting position, the plate engages the ends of the boards cut from the log, and pushes these boards axially from the log. Thus, thus, an operator standing adjacent the end of the log where the carriage is located when at its starting position may take the boards as they are displaced toward him, and stack them in suitable piles.

After the saws have been moved along the length of the log by the carriage in a cutting pass, and upon return of the carriage to its starting position, frame 16 is advanced along track elements or rails 14, a distance corresponding to the width of the boards that it is desired next to cut from the log. The frame is thus advanced a step after each cut. The means for advancing the frame over the rails will now be described.

Referring to FIGS. 3 and 5, projecting outwardly to one side of frame 16, and adjacent opposite ends of the log, are a pair of cables 176. These cables have their outermost ends anchored in place, using means such as anchoring elements 178 that are secured to the ends of rails 14. Each cable extends from its anchoring element, and through a sleeve 179 fastened to frame 16 (as by bracket 180 fastened to the frame by fastener 182), to one of a pair of spools 184 located within frame 16 and illustrated in FIG. 3. One of the spools for the two cables is secured to an elongated shaft 186 which extends longitudinally along the frame, and which is suitably journaled in place and adjacent its ends. The other spool is secured to a rotatable tube 187 encircling shaft 186. Shaft 186 and tube 187 have crank handles 188, 189 joined to their ends. Upon turning the handles, and shaft and tube rotate, and so also do the spools, whereby the cables which are joined to the spools are wound about the spools.

From this it will be seen that frame 16 is advanced along the tracks or rails by a cable adjacent each end of the frame which tenses and pulls against a fastener 178 when the frame is shifted. Advancement of the frame may be produced by a single operator standing adjacent one end of the frame, by turning the appropriate handle or handles.

Travel-limiting means 190 is provided for limiting the distance that the frame is advanced after the completion of a cutting pass and the removal of the just-cut boards. The distance that the frame advances corresponds to the width of the board or boards next to be cut, and thus such a limiting means is important in obtaining accurately dimensioned lumber.

Referring to FIG. 3, pivotally mounted at 194 on frame 16, adjacent each end of the log, is an arm 192. One end of each arm has a spring 196 connected thereto, interposed between the end and a portion of the frame. Mounted on the opposite end of each arm is a threaded feeler stud 198. By turning the stud, the stud may be advanced or retracted relative to the end of the arm.

Springs 196 function to keep the two arms 192 in a position substantially normal to frame 16, as illustrated in FIG. 3. In this position, the arms and the feeler studs mounted on the ends thereof, function to limit travel of the frame transversely of the log after a cutting pass, by engaging the vertical kerf produced in the log during the cutting pass just made. The arms are swung out of the way, to accommodate movement of the saws and carriage during a cutting pass, by a bar 202 joined to the carriage, which depends downwardly from the carriage adjacent the forward end thereof (see FIG. 1).

Explaining the operation of the apparatus, and the cutting of boards, from a log lying on the ground, initially track or rail members 14 are secured in suitable horizontal positions against the ends of the log, as illustrated in FIG. 5. Frame 16 is then mounted on the track members. Vertically adjustable saw 52 may then be adjusted to the desired height, where it will cut off imperfect or waste portions of the log. With the motor operating, and the carriage occupying its starting position, rod 136 may be pushed forwardly, to cause the motor to start movement of the carriage forwardly along frame 16, and a cutting pass by the saws.

During the movement of the carriage along the frame, the saws discussed produce horizontal and vertical kerfs in the log, which join each other to produce an elongated board or boards. Upon the completion of a cutting pass, the ejector plate swings to its position perpendicular to the frame. On return movement of the carriage, the just-cut boards are displaced by shifting them axially of the log and toward the operator. He may then stack the boards as they are delivered to him.

After the completion of a cutting pass, the frame is moved transversely of the log, along tracks 14, a sufficient distance to place the travel limiting means discussed in contact with the vertical kerf produced on the previous cutting pass. After suitable adjustment has been made in vertically adjustable saw 52, another cutting pass may be undertaken.

It will be noted that lower saw 54 occupies a plane which is spaced below the base of frame 16. Thus the frame may be moved over the just-cut portions of a log. With transverse movement of the frame, the shoes that extend outwardly of the frame and beneath this horizontal saw slide along the top of the rails. The carriage when moving during a cutting pass is guided by portions of the frame which are located above and some distance away from the saws. These frame portions remain substantially free of sawdust. With the rigid frame contemplated, the saws are guided along a straight, undeviating path during each cutting pass.

Movement of the carriage during a cutting pass, and return movement of the carriage, with ejection of boards, are both under power. Carriage movement is reversed automatically. The saw apparatus may be operated by a single operator positioned adjacent the starting position for the carriage, whereby he makes appropriate adjustments in the means for advancing the frame after a cutting pass. During the cutting of boards, any assistant for this operator may busy himself with setting up new logs, cleaning up the area, and other tasks.

The apparatus is easily moved about, even in rough terrain. The apparatus may be used in areas where conventional lumbering techniques make lumber production impractical.

While an embodiment of the invention has been described, changes and variations are obviously possible without departing from the invention. It is desired to cover all modifications and variations as would be apparent to one skilled in the art, and that come within the scope of the appended claims.

We claim:
1. A portable saw apparatus comprising:
   a. An elongated main frame having top and bottom sides and being arranged to be supported beside a stationary log with the frame extending along the length of the log;
   b. rail means extending longitudinally along the upper side of said frame;
   c. a carriage movable longitudinally of said main frame and supported on said rail means;
   d. means driving said carriage in forward and reverse directions on said rail means;
   e. said carriage including a frame;
   f. a portion of said carriage frame projecting beyond one side of said main frame for disposition on the side of the latter which is adjacent the log;
   g. a first saw mounted on the projecting portion of the carriage frame in a horizontal plane;
   h. a second saw mounted on the projecting portion of the carriage frame in a vertical plane;
   i. said first and second saws having cutting edges in adjacent relationship and being arranged to produce cuts for removing a strip from a log upon movement of the carriage in its forward direction along said main frame;
   j. the adjacent cutting edges of the said first and second saws being disposed in a plane below the upper side of said main frame; and
   k. means supporting said main frame for moving the latter transversely of a log.

2. The portable saw apparatus of claim 1 wherein said first saw is disposed in a plane at least as low as the bottom side of said main frame.

3. The portable saw apparatus of claim 1 including:
   a. means arranged to be supported transversely adjacent the ends of the log for supporting said main frame; and
   b. said first saw being disposed in a plane at least as low as the bottom side of said main frame.

4. The portable saw apparatus of claim 1 wherein said second saw is mounted in a plane outward of the projecting portion of said carriage frame.

5. The portable saw apparatus of claim 1 wherein:
   a. one of said rail means and carriage includes laterally projecting flange means; and
   b. the other of said rail means and carriage includes means arranged for engaging both the upper and lower sides of said flange for movement longitudinally of the flange but restricted against vertical movement whereby said carriage is supported against lateral tilting movement on the main frame toward the side of its said projecting frame.

6. The portable saw apparatus of claim 1 including;
   a. a stop arm on said main frame; and
   b. said arm extending laterally in the direction of extension of said projecting carriage frame portion and being arranged for engagement with a vertical cut portion of a log made by a previous cutting pass to position the main frame for cutting a strip of wood from the log.

7. The portable saw apparatus of claim 6 wherein said arm has length adjustment to vary the thickness of the strips of wood to be cut from the log.

8. The portable saw apparatus of claim 6 wherein said stop arm has pivotal mounting on a vertical axis on said main frame whereby to pivot out of the way of said carriage when the latter advances along the main frame.

9. The portable saw apparatus of claim 1 including an ejector pivotally mounted on said carriage arranged to ride over a strip being cut in forward movement of said carriage and arranged to engage a cut strip and return the latter with the carriage upon reverse movement of the latter.